(12) United States Patent
Lanter et al.

(10) Patent No.: US 8,547,217 B2
(45) Date of Patent: Oct. 1, 2013

(54) BELT LOCK WITH STATUS DETECTOR

(75) Inventors: Joshua Lanter, Chur (CH); Clau Lombriser, Trun (CH)

(73) Assignee: Polycontact AG, Chur (CH)

(*) Notice: Subject to any disclaimer, the term of this patent is extended or adjusted under 35 U.S.C. 154(b) by 428 days.

(21) Appl. No.: 12/894,958

(22) Filed: Sep. 30, 2010

(65) Prior Publication Data

US 2011/0080279 A1    Apr. 7, 2011

(30) Foreign Application Priority Data

Oct. 1, 2009   (CH) ...................................... 1514/09

(51) Int. Cl.
*B60Q 1/00*    (2006.01)
*E05B 45/06*   (2006.01)
*A41F 1/00*    (2006.01)

(52) U.S. Cl.
USPC ................... 340/457.1; 340/426.28; 340/542; 340/686.4; 200/61.72; 200/547; 200/85 A; 24/572.1; 24/579.09

(58) Field of Classification Search
USPC ....................................... 340/457.1
See application file for complete search history.

(56) References Cited

U.S. PATENT DOCUMENTS

| 5,406,252 A * | 4/1995 | Dear .......................... 340/457.1 |
| 7,148,809 B2 * | 12/2006 | Enomoto et al. ........... 340/686.1 |
| 7,538,283 B2 * | 5/2009 | Muromachi ........... 200/61.58 B |

FOREIGN PATENT DOCUMENTS

EP          0 861 763 A2    9/1998

* cited by examiner

*Primary Examiner* — Donnie Crosland
(74) *Attorney, Agent, or Firm* — Buchanan Ingersoll & Rooney PC

(57) ABSTRACT

A belt lock for a seat belt that has a locking mechanism that is arranged in a belt lock housing. The locking mechanism includes a component that changes location from a first end position into a second end position when the locking mechanism is actuated, and in doing so interacts with a status detector. The status detector is designed as an electrical switching system. The component that changes location is a mandrel that can be moved axially when the locking mechanism is actuated and that is provided with an electrically conductive contact region and forms a component of the electrical switching system.

16 Claims, 2 Drawing Sheets

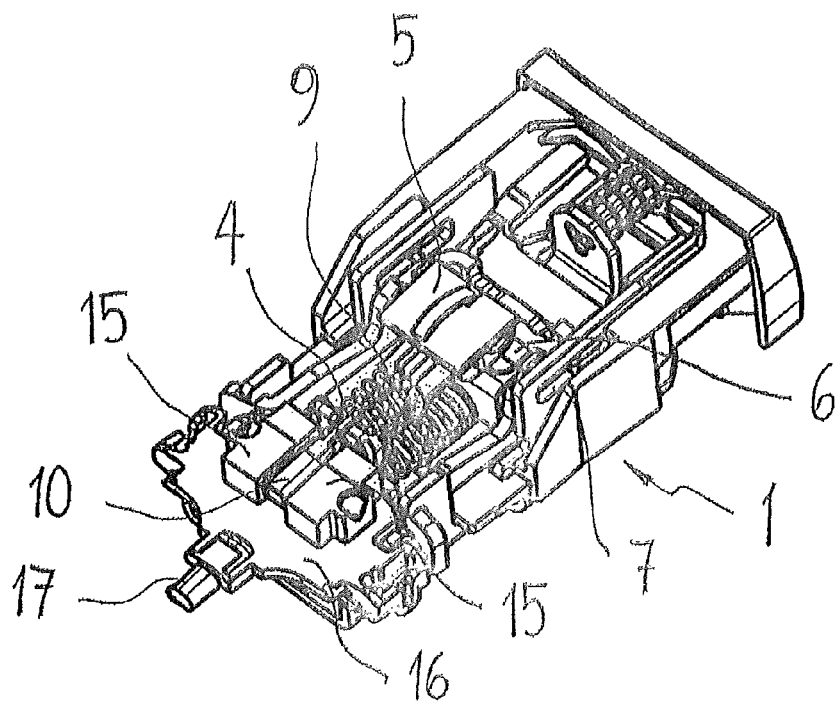
Fig. 2
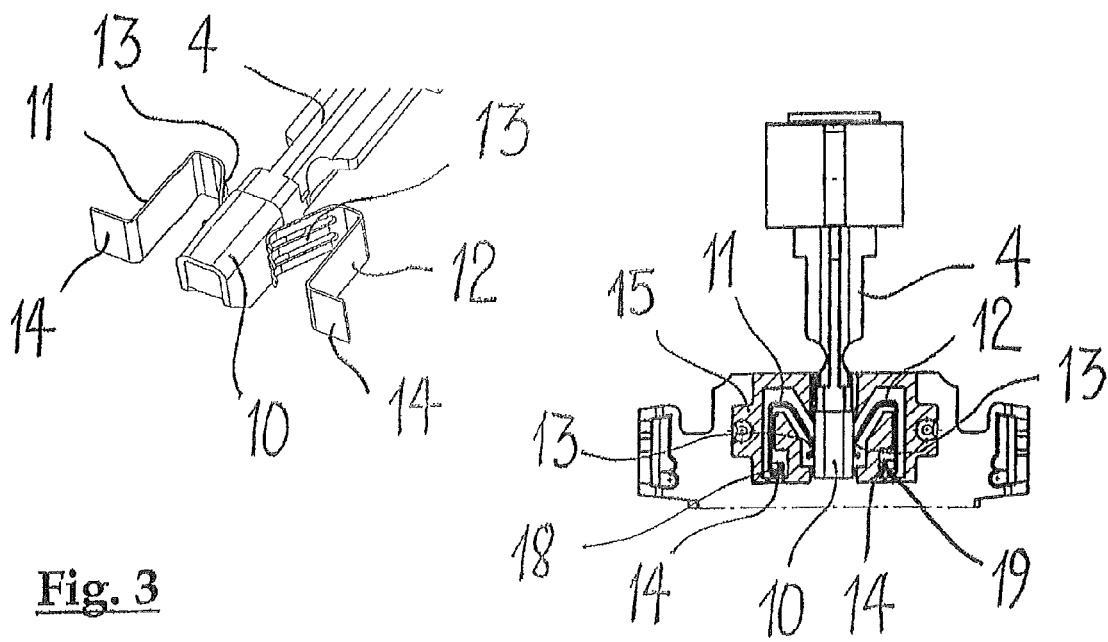
Fig. 3
Fig. 4

BELT LOCK WITH STATUS DETECTOR

RELATED APPLICATIONS

This application claims priority under 35 U.S.C. §119 to Swiss Patent Application No. 01514/09 filed in Switzerland on Oct. 1, 2009, the entire content of which is hereby incorporated by reference in its entirety.

FIELD

The disclosure relates to a belt lock for a seat belt, for example in an automobile, with a status detector.

BACKGROUND INFORMATION

In technical applications, such as, for example, automobile construction and the like, it can be necessary to quickly and reliably detect the location of a component that can be moved into two end positions relative to a stationary part, using measurement technology. In the case of a belt lock of an automobile, it can be checked, for example, whether a passenger is belted or not. Knowledge of the state of the belt lock is useful to notify a passenger by a signal to put on and fasten the seat belts. Since the introduction of airbags, information about the closed state of the seat belts has also been useful for activating or deactivating mechanisms for inflating driver and passenger airbags or side and head airbags.

For example, in known applications, there are Hall sensors for contactless monitoring of the components that change their location, for example, ones that can assume two different end positions. Hall sensors can include a semiconductor layer supplied with a constant current, in a known integrated construction. A magnetic field component perpendicular to the semiconductor layer can influence the constant current, and the sensor delivers a Hall voltage that can be evaluated, tapped and used to evaluate a status, or that can also be used directly as a switching voltage. The integrated construction of Hall sensors can make it possible to integrate an evaluation circuit that is suitable for evaluation of the switching state on the Hall sensor. In the automotive industry, therefore, Hall sensors can be used as contactless status sensor in many applications.

EP-A-0 861 763 discloses, for example, a belt lock with an integrated, pretensioned Hall sensor that without contact detects the state of a locking body or an ejector for a lock tongue that has been inserted into the belt lock. Here, a Hall sensor with a Hall field can be located in direct proximity to a permanent magnet. Changing the location of the locking body and of the ejector that includes a ferromagnetic material for this purpose changes the magnetic field of the permanent magnet. In doing so, the signal of the Hall sensor changes, and at the output of the Hall sensor, the status change can be tapped as a voltage change. In one embodiment, it is suggested that the Hall sensor with a Hall field be installed without a permanent magnet and the locking body or the ejector be designed as a permanent magnet for this purpose. In this arrangement, the change in the position of the locking body or of the ejector will also be detectable by the change of the Hall voltage.

A disadvantage in the belt lock according to EP-A-0 861 763 is that the Hall sensor must be positioned very carefully with reference to the locking element or the ejector. Subsequent installation of the Hall sensor is therefore relatively complex and expensive. Depending on its arrangement, the Hall sensor is also sensitive to external stray electromagnetic fields that can be caused by, for example, a magnetic key ring. Optionally, even additional shielding must be mounted. This further complicates the structure or the installation. The susceptibility to external stray fields can also be increased by the signal changes being relatively small due to the relatively short paths that must be traversed by the locking body or the ejector when the seat belt lock is locked or unlocked. The seat belt variant without a pretensioned Hall sensor in which either the locking body or the ejector is designed as a permanent magnet is less practicable. The attainable signal changes are also relatively small here. This can make it difficult to detect different states, for example, the belt lock locked or unlocked. Vibrations of the locking body and of the ejector during locking and unlocking of the seat belt can cause demagnetization of the permanent magnet with time. This can ultimately lead to the Hall sensor becoming ineffective and the status changes of the belt lock no longer being able to be reliably detected.

The known belt locks can have a compact design that therefore can seriously limit the available space within the belt lock. This makes it difficult to arrange sensor components within the belt lock housing, especially in the vicinity of a component that changes its location from one end position into the other end position when the belt lock is actuated. If shields are also to be attached, the engineer is generally faced with an essentially insoluble problem because the dimensions of the belt lock housing are not to be changed.

SUMMARY

A belt lock for a seat belt is disclosed including, a locking mechanism that is arranged in a belt lock housing and that includes a component that changes location from a first end position into a second end position when the locking mechanism is actuated, and a status detector that interacts with the component that changes location. The status detector is an electrical switching system and the component that changes location is a mandrel for moving axially along a displacement path when the locking mechanism is actuated and that is provided with an electrically conductive contact region and forms a component of the electrical switching system.

The disclosure relates to a belt lock whose unlocked or locked state can be easily and reliably ascertained. The belt lock can be equipped with a status detector that can be insensitive to stray and disruptive magnetic fields. The dimensions of the belt lock housing are kept unchanged. Simple and economical installation can be enabled, which also promotes retrofitting of existing belt lock systems of varied designs.

The disclosure relates to a belt lock for a seat belt that has a locking mechanism that is located in a belt lock housing. The locking mechanism includes a component that changes location from a first end position into a second end position upon its actuation and in doing so interacts with a status detector. The status detector can be designed as an electrical switching system. The component that changes location can be a mandrel that can be moved axially when the locking mechanism is actuated and that can be provided with an electrically conductive contact region and forms a component of the electrical switching system.

The belt lock proposed by the disclosure can be equipped with an electromechanical system that has a very simple and space-saving structure. The component that changes location—the mandrel that can be axially moved when the locking mechanism of the belt lock is actuated—forms the switching element of the electrical switching system and of the status detector. This can prevent malfunctions as a result of the connections of the switching elements to the moving part being incomplete or becoming loose. Electric lines, solder sites or the like within the belt lock housing can be omitted in the construction according to the disclosure. In this way, the proposed belt lock can also be insensitive to mechanical stresses. The electrical switching system can also largely be insensitive to disruptive magnetic fields. Thus, additional shielding and the like can be omitted. Design modifications on the seat belt housing are not necessary due to the compact design. In one exemplary embodiment of the disclosure, the electrical switching system can be a sliding contact arrangement. Sliding contacts are simple to implement. They can be mechanically durable and ensure that reliable contact can be made for distinguishing the locked and unlocked state of the belt lock.

A structurally simple variant of the belt lock calls for the axially movable mandrel on its free end to bear an electrically conductive sleeve that in one of its two end positions can be brought into sliding contact with two electrical contacts that can be arranged laterally to the displacement path of the mandrel.

For preparing a reliable switching contact, the two electrical contacts can each have a contact section that can be pretensioned elastically against the electrically conductive sleeve. One exemplary embodiment of the belt lock calls for the electrically conductive sleeve to be made with laterally projecting elastic contact sections and the electrical contacts to be formed by two contact sheets arranged laterally to the displacement path of the mandrel. Both variants can ensure reliable electrical contact when the locking mechanism of the belt lock is actuated in order to obtain the desired information about the status of the belt lock.

To simplify mounting, the electrical contacts that are arranged on either side of the displacement path of the mandrel can be equipped with positively acting connection regions. Besides simplified mounting, this can also avoid solder sites or similar bonded contacts that are arranged within the belt lock housing and that can be relatively sensitive to the vibrations that are active in a moving vehicle.

In another exemplary embodiment of the belt lock, the connection regions of the electrical contacts can be designed as U-shaped receivers for contact pins or the like. Contact can then be made simply by inserting, for example, contact pins into the receivers intended for this purpose. This can take place, for example, using a mounting robot.

The status detector designed as an electrical switching system can be designed as a normally open (N/O) contact or as a normally closed (N/C) contact. In the locking of the belt lock, the axial movement of the mandrel opens or closes an electrical circuit. When locking is disengaged, the mandrel moves back into its initial position and opens or closes the circuit. This digital status information of the status detector can be used for various purposes.

One advantageous use of a belt lock that is equipped according to the disclosure includes generating an optical and/or acoustic warning signal for the passengers of, for example, an automobile to fasten their seat belts. Furthermore, the belt lock that is equipped according to the disclosure can also be used for activation or deactivation of mechanisms for inflating airbags for the passengers of an automobile.

BRIEF DESCRIPTION OF THE DRAWINGS

Other advantages and features of the disclosure will become apparent from the following description of schematics of an exemplary embodiment of the device according to the disclosure. The schematics are not to scale.

FIG. 2 shows a perspective view of an exemplary embodiment of the assembled belt lock without a belt lock housing;

FIG. 3 shows a schematic an exemplary embodiment of a status detector of the belt lock; and FIG. 4 shows a partial cutaway representation an exemplary embodiment of the components of the status detector.

DETAILED DESCRIPTION

Figure 1:
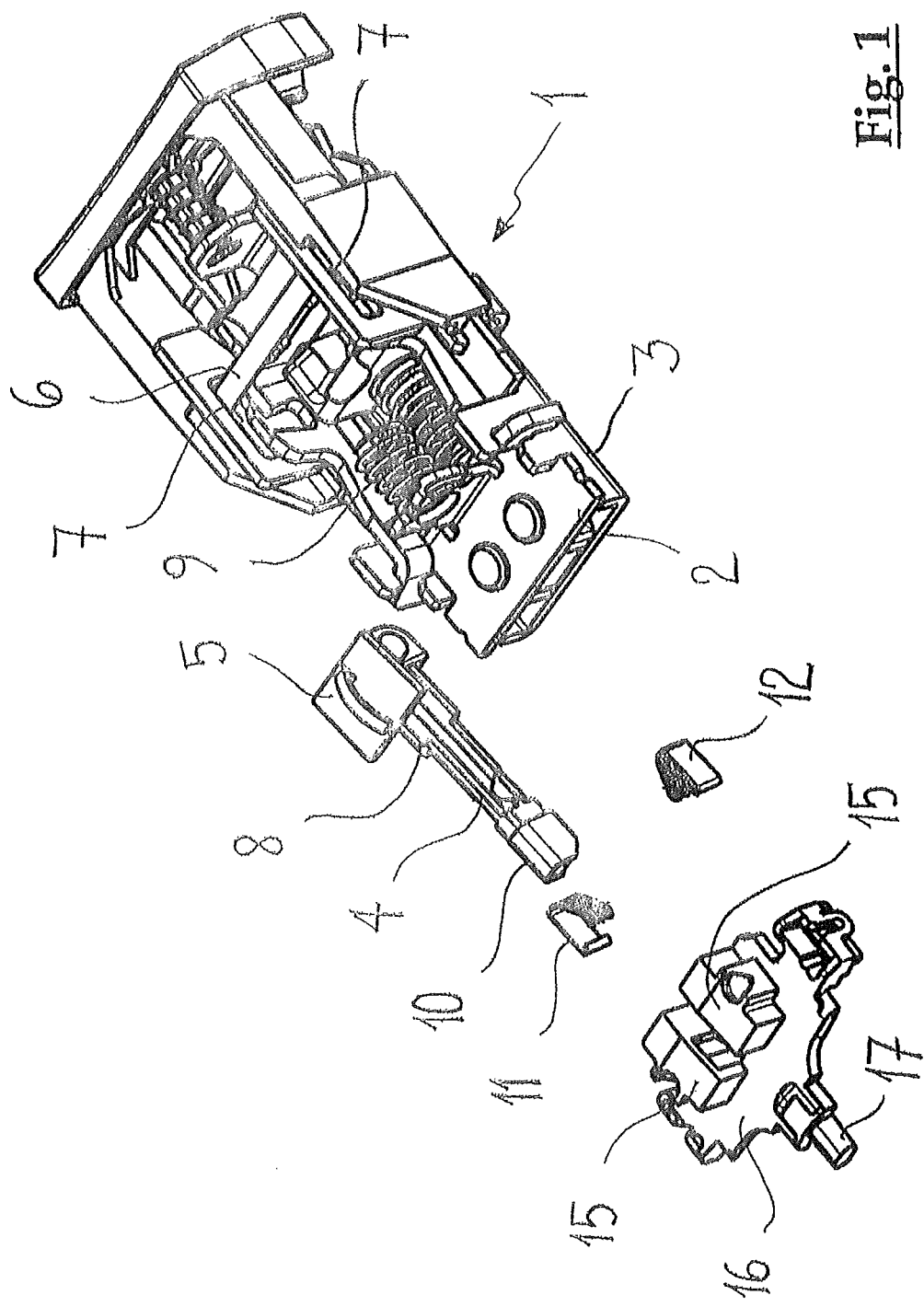
FIG. 1 shows a partially exploded perspective view of a belt lock according to an exemplary embodiment of the disclosure without the belt lock housing.

The belt lock shown in FIG. 1 in a partially exploded perspective view and in FIG. 2 in the assembled state corresponds largely to the belt lock shown in EP-1 025 774 B1 using FIGS. 1-6, the entire contents of which are hereby incorporated by reference. The following description of the disclosure is therefore limited to the components of the belt lock that are important to the understanding of the disclosure.

FIGS. 1 and 2 show the belt lock in each case without the belt lock housing. For example, the belt lock housing includes two housing shells that can be screwed to one another or can be bonded to one another in any suitable manner. A fastener frame of the belt lock is provided with the reference number 1 as a whole. The fastener frame 1 is composed of an upper and a lower plate 2, 3 that can be connected to one another by connecting pins. Between the upper and lower plates 2, 3, a guide channel remains open into which the metallic clip of the seat belt can be inserted (not shown). The actual locking mechanism and an ejector can be mounted on the fastener frame 1 or on the two plates 2, 3 and will not be explained in more detail here.

The locking mechanism includes a rod-shaped mandrel 4 whose one end has an engagement part 5. The engagement part 5 acts on a locking pin 6 that in the locking position secures a locking element that is not shown in more detail. The locking pin 6 is guided lengthwise in slot guides 7 in the frame. The slot guides 7 run essentially parallel to the guide channel for the belt clip. The rod-shaped mandrel 4 can be inserted through a pretensioning spring 9 that is designed as a helical compression spring. The pretensioning spring 9 can be supported, on the fastener frame 1 and, on one shoulder 8 of the rod-shaped mandrel 4 and pretensions the locking pin 6 by way of the engagement part 5. The mandrel 4 can be used at the same time as a guide for the pretensioning spring 9 that thus retains its linear alignment in each displacement position of the locking pin 6. When the fastener mechanism is actuated, the locking pin 6 can be pushed forward and backward in the slot guides against the spring force of the pretensioning spring. By way of the engagement part 5, the mandrel 4 also follows the axial displacement motion of the locking pin 6 and can thus be pushed axially out of the first end position into a second end position and vice versa for each actuation of the fastening mechanism.

On its free lengthwise end that is opposite the engagement part 5, the mandrel 4 has an electrically conductive contact region. In the exemplary embodiment shown, the electrically conductive contact region can be formed by a metallic sleeve 10 that is pushed onto the mandrel 4 and fastened there. In an end position of the axially movable mandrel 4, the metallic sleeve 10 moves into sliding contact with two electrical contacts 11, 12 that are located on either side of the axial displacement path of the mandrel 4. The two electrical contacts 11, 12 can be housed in the contact receivers 15 that are mounted on an end piece 16. The end piece 16 can be permanently joined to the frame 1 of the belt lock and is arranged on the end of an anchor 17 via which the belt lock can be screwed, for example, to a frame part of an automobile.

FIG. 3 shows the axially movable mandrel 4 with its metallic sleeve 10 and the two electrical contacts 11, 12 that can be designed as sliding contacts. For this purpose, the electrical contacts 11, 12 each have elastic contact sections 13. The end sections 14 of the electrical contacts 11, 12 facing away therefrom can be used for connection to a voltage source. The axially movable mandrel 4 with the metallic sleeve 10 and the two electrical contacts 11, 12 are components of a sliding contact arrangement. The sliding contact arrangement forms an electrical switching system that is used as a status detector 20 for the locked state of the belt lock. In an end position of the axially movable mandrel 4, for example in the locking state in which the metallic sleeve 10 is in sliding contact with the two electrical contacts 11, 12, the circuit is closed. When the locking mechanism is released, the mandrel 4 returns to its initial position. Here, the metallic sleeve 10 is axially moved relative to the two sliding contacts 11, 12 such that the electrical circuit can be interrupted. In this way, for example, the two states "passenger belted" and "passenger not belted" can be clearly distinguished.

FIG. 4 shows the arrangement of the electrical sliding contacts 11, 12 within the contact receivers 15. The figure shows that the elastic contact sections 13 adjoin the metallic sleeve 10 of the axially movable mandrel 4. The end sections 14 of the two electrical contacts 11, 12 facing away from the mandrel are, for example, flanged in a U-shape and form positive receivers for the contact pins 18, 19 that lead out of the belt housing.

The figures show the status detector 20 using the example of a central sliding contact arrangement in which a metallic sleeve 10 that is arranged on the mandrel 4 interacts with the sliding contacts 11, 12 that each have an elastically resilient contact section 13. In an exemplary embodiment of the disclosure, however, the metallic sleeve could also be equipped with laterally projecting, elastically resilient contact regions that interact with contact sheets that are arranged on either side of the axial displacement path of the mandrel. The status detector 20, as shown, can be designed as an N/O contact in which the circuit is closed when the belt lock is locked. Alternatively, the status detector can also be designed as an electrical switching system that opens a circuit upon locking.

The information about the state of the belt lock that is obtained by the electromechanically acting status detector can be used, for example, for a belt warning indicator by an optical and/or acoustic warning signal being produced depending on the detected belt state, which communicates to the passenger or passengers of an automobile to fasten their seat belts. Furthermore, the belt lock that is equipped according to the disclosure can also be used for activation or deactivation of mechanisms for inflating airbags for the passengers of an automobile. If there is no passenger in the vehicle, the airbags on the passenger side can be deactivated based on the detected belt state (unlocked).

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A lock for a seat belt, comprising:
   a locking mechanism that is arranged in a belt lock housing and that includes;
   a component that changes location from a first end position to a second end position when the locking mechanism is actuated, and
   a mechanically operable electrical switch interacts with the component that changes location by direct contact therebetween, wherein the component that changes location is a mandrel for moving axially along a displacement path when the locking mechanism is actuated, the mandrel including an electrically conductive contact region that forms a component of the mechanically operable electrical switch.

2. The belt lock according to claim 1, wherein the mechanically operable electrical switch includes a sliding contact arrangement.

3. The belt lock according to claim 2, comprising:
   two electrical contacts arranged laterally to the displacement path of the mandrel to face each other with a gap in between wherein the axially movable mandrel includes a free end that bears an electrically conductive sleeve that in one of two end positions is brought into the gap and in sliding contact with the two electrical contacts.

4. The belt lock according to claim 3, wherein the two electrical contacts each have a contact section that is pretensioned elastically against the electrically conductive sleeve.

5. The belt lock according to claim 3, wherein the electrically conductive sleeve is designed with laterally projecting elastic contact sections, and the electrical contacts are formed by two contact sheets that are arranged laterally to the displacement path of the mandrel.

6. The belt lock according to claim 4, wherein the electrical contacts that are arranged on either side of the displacement path of the mandrel are equipped with positively acting connection regions.

7. The belt lock according to claim 6, wherein the connection regions of the electrical contacts are present as U-shaped receivers for contact pins.

8. The belt lock according to claim 1, wherein the mechanically operable electrical switch is designed as an N/O contact.

9. The belt lock according to claim 1, comprising at least one of activating and deactivating mechanisms for inflating airbags for passengers of an automobile.

10. The belt lock according to claim 5, wherein the electrical contacts that are arranged on either side of the displacement path of the mandrel are equipped with positively acting connection regions.

11. The belt lock according to claim 2, wherein the electrical switching system is designed as an N/O contact.

12. The belt lock according to claim 3, wherein the mechanically operable electrical switch is designed as an N/O contact.

13. The belt lock according to claim 4, wherein the mechanically operable electrical switch is designed as an N/O contact.

14. The lock according to claim 2, comprising at least one of activating and deactivating mechanisms for inflating airbags for passengers of an automobile.

15. The lock according to claim 3, comprising at least one of activating and deactivating mechanisms for inflating airbags for passengers of an automobile.

16. The lock according to claim 4, comprising at least one of activating and deactivating mechanisms for inflating airbags for passengers of an automobile.

* * * * *